United States Patent
Kumawat et al.

(10) Patent No.: US 11,200,572 B2
(45) Date of Patent: Dec. 14, 2021

(54) ENCODING ONE-TIME PASSWORDS AS AUDIO TRANSMISSIONS INCLUDING SECURITY ARTIFACTS

(71) Applicant: MASTERCARD INTERNATIONAL INCORPORATED, Purchase, NY (US)

(72) Inventors: Jaipal Singh Kumawat, Rajasthan (IN); Gurpreet Atwal, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 34 days.

(21) Appl. No.: 16/287,803

(22) Filed: Feb. 27, 2019

(65) Prior Publication Data

US 2020/0273029 A1    Aug. 27, 2020

(51) Int. Cl.
*G06Q 20/10* (2012.01)
*G06Q 40/02* (2012.01)
(Continued)

(52) U.S. Cl.
CPC ......... *G06Q 20/40* (2013.01); *G06Q 20/3226* (2013.01); *G10L 25/51* (2013.01)

(58) Field of Classification Search
CPC .. G06Q 20/405; G06Q 20/40; G06Q 20/4016; G06Q 20/3224; G06Q 20/40145; G06Q 20/4014; G06Q 20/322; G06Q 20/382; G06Q 20/10; G06Q 20/401; G06Q 20/3278; G06Q 20/20; G06Q 20/385; G06Q 20/32; G06Q 20/321; G06Q 20/327; G06Q 20/3226; G06Q 20/425; G06Q 20/027;
(Continued)

(56) References Cited

U.S. PATENT DOCUMENTS 8,516,562 B2   8/2013 Headley
8,751,349 B1 * 6/2014 Jentoft .................. G07F 7/0886
                                                    705/35

(Continued)

OTHER PUBLICATIONS

STIC EIC Search Report Include Patent, NPL, IP.com Search, dated Jun. 25, 2021, 19 pages (pp. 2-4 are deleted). (Year: 2021).*

*Primary Examiner* — Hai Tran
(74) *Attorney, Agent, or Firm* — Armstrong Teasdale LLP

(57) ABSTRACT

An authentication server computing device is provided. The authentication server computing device is configured to receive a transaction request from an audio interface device, generate a first audio file including a first audio transmission, wherein the first audio transmission includes a primary security artifact and at least one secondary security artifact and the primary security artifact is an encoding of a one-time password, store a reference data file including the first audio transmission, transmit the first audio file to a verified user computing device associated with the account identifier, receive a second audio file from the audio interface device, wherein the second audio file includes a second audio transmission, verify the second audio transmission by comparing the second audio transmission to the reference data file including the primary security artifact and the at least one secondary security artifact, and authorize the transaction based on verifying the second audio transmission.

19 Claims, 8 Drawing Sheets

(51) Int. Cl.
*G06Q 20/40* (2012.01)
*G06Q 20/32* (2012.01)
*G10L 25/51* (2013.01)

(58) Field of Classification Search
CPC ...... G06Q 20/12; G06Q 20/325; G06Q 20/34;
G06Q 20/4012; G06Q 20/407; G06Q
20/42; G06Q 20/3674; G06Q 20/102;
G06Q 20/3227; G06Q 20/3821; G06Q
2220/00; G06Q 40/02; G06Q 20/02;
G06Q 20/065; G06Q 20/1085; G06Q
20/24; G06Q 20/308; G06Q 20/3229;
G06Q 20/3276; G06Q 20/341; G06Q
20/354; G06Q 20/3827; G06Q 20/3829;
G06Q 20/384; G06Q 20/409; G06Q
30/0267; G06Q 30/06; G06Q 20/0855;
G06Q 20/105; G06Q 20/14; G06Q
20/204; G06Q 20/29; G06Q 20/3223;
G06Q 20/3255; G06Q 20/3274; G06Q
20/347; G06Q 20/352; G06Q 20/36;
G06Q 20/38; G06Q 20/3825; G06Q
20/383; G06Q 20/386; G06Q 20/389;
G06Q 20/4018; G06Q 20/4093; G06Q
20/4097; G06Q 30/0613; G06Q 30/0635;
G06Q 30/0641; G06Q 50/01; G06Q
10/00; G06Q 10/02; G06Q 10/10; G06Q
20/04; G06Q 20/042; G06Q 20/045;
G06Q 20/047; G06Q 20/06; G06Q 20/08;
G06Q 20/085; G06Q 20/108; G06Q
20/16; G06Q 20/202; G06Q 20/206;
G06Q 20/208; G06Q 20/223; G06Q
20/227; G06Q 20/229; G06Q 20/2295;
G06Q 20/26; G06Q 20/28; G06Q 20/306;
G06Q 20/3221; G06Q 20/3263; G06Q
20/342; G06Q 20/349; G06Q 20/356;
G06Q 20/357; G06Q 20/3572; G06Q
20/3576; G06Q 20/3672; G06Q 20/3678;
G06Q 20/4015; G06Q 20/4037; G06Q
30/00; G06Q 30/01; G06Q 30/02; G06Q
30/0205; G06Q 30/0215; G06Q 30/0229;
G06Q 30/0238; G06Q 30/0259; G06Q
30/0266; G06Q 30/0268; G06Q 30/0269;
G06Q 30/0271; G06Q 30/0601; G06Q
30/0625; G06Q 30/0631; G06Q 30/0633;
G06Q 30/0639; G06Q 30/0643; G06Q
40/00; G06Q 50/12; G06Q 50/26; G06Q
50/30
USPC .......................................................... 705/44
See application file for complete search history.

(56) References Cited

U.S. PATENT DOCUMENTS

| | | | | |
|---|---|---|---|---|
| 9,183,490 | B2* | 11/2015 | Moreton | .................. H04W 4/80 |
| 2005/0075985 | A1* | 4/2005 | Cartmell | ................ G06Q 20/12 |
| | | | | 705/67 |
| 2011/0246197 | A1 | 10/2011 | Cabezas et al. | |
| 2013/0132091 | A1 | 5/2013 | Skerpac | |
| 2015/0088746 | A1* | 3/2015 | Hoffman | .......... G06Q 20/40145 |
| | | | | 705/44 |
| 2016/0012423 | A1* | 1/2016 | Chitilian | .............. G06Q 20/326 |
| | | | | 705/67 |
| 2016/0063498 | A1* | 3/2016 | Li | ........................ G06Q 20/405 |
| | | | | 705/44 |
| 2016/0148205 | A1* | 5/2016 | Karantzis | .......... G06Q 20/4014 |
| | | | | 705/44 |
| 2017/0024740 | A1* | 1/2017 | Todasco | ............. H04M 3/42059 |
| 2017/0331807 | A1* | 11/2017 | Mont-Reynaud | ........................... |
| | | | | H04W 12/0802 |
| 2018/0307818 | A1* | 10/2018 | Yano | .................... A61B 5/6817 |

* cited by examiner

ENCODING ONE-TIME PASSWORDS AS AUDIO TRANSMISSIONS INCLUDING SECURITY ARTIFACTS

BACKGROUND

This disclosure relates generally to secure authentication systems, and more specifically, to encoding one-time passwords as audio transmissions including security artifacts.

Audio interface devices or "smart home" devices, such as Alexa, Cortana, or Google Home devices, have become a household staple in recent years. (Alexa is a registered trademark of Amazon Technologies Inc., Reno, Nev.; Cortana is a registered trademark of Microsoft Corporation, Redmond, Wash.; and Google Home is a registered trademark of Google LLC, Mountain View, Calif.) One developing feature of these audio interface devices is the ability to place orders for products or request services using voice commands. For example, many users order kitchen and household essentials, request transportation services, and/or request cleaning services using audio interface devices. The rapid development of audio interface devices raises security concerns. The ease of use and accessibility associated with these devices may increase the risk of fraud.

Other computing devices, such as smartphones, may also be used to order products and services. However, these devices are conventionally protected with biometric and/or passcode authentication. Frequently, users are authenticated using Facial Recognition, Fingerprint Recognition, and/or password authentication on these devices. However, these authentication methods are ill-suited for audio interface devices. Requiring a user to speak a password aloud as a voice command would compromise the security of the password, and allow other users to hear and repeat the password. For example, it is common for children to repeat audio commands, which could lead to unexpected transactions. One advantage of audio interface devices is users can complete other activities, such as cooking or cleaning, while operating the audio interface device using voice commands. Biometric (e.g., face, fingerprint) authentication would require the user to directly interact with the audio interface device, negating the remote operation benefits of audio interface devices.

There is a need for an authentication system configured for audio interface devices, such that the ease of use and remote operation is maintained, while also increasing security.

BRIEF DESCRIPTION

In one aspect, an authentication server computing device including a processor is provided. The authentication server computing device is configured to receive a transaction request from an audio interface device, wherein the transaction request includes an account identifier of a payment transaction, generate a first audio file including a first audio transmission, wherein the first audio transmission includes a primary security artifact and at least one secondary security artifact and the primary security artifact is an encoding of a one-time password, store a reference data file including the first audio transmission, transmit the first audio file to a verified user computing device associated with the account identifier, receive a second audio file from the audio interface device, wherein the second audio file includes a second audio transmission, verify the second audio transmission by comparing the second audio transmission to the reference data file including the primary security artifact and the at least one secondary security artifact, and authorize the transaction based on verifying the second audio transmission.

In another aspect, a non-transitory computer readable medium that includes executable instructions for authenticating audio interface devices is provided. When executed by an authentication server computing device including at least one processor in communication with at least one memory device, the computer executable instructions cause the authentication server computing device to: receive a transaction request from an audio interface device, wherein the transaction request includes an account identifier of a payment transaction, generate a first audio file including a first audio transmission, wherein the first audio transmission includes a primary security artifact and at least one secondary security artifact and the primary security artifact is an encoding of a one-time password, store a reference data file including the first audio transmission, transmit the first audio file to a verified user computing device associated with the account identifier, receive a second audio file from the audio interface device, wherein the second audio file includes a second audio transmission, verify the second audio transmission by comparing the second audio transmission to the reference data file including the primary security artifact and the at least one secondary security artifact, and authorize the transaction based on verifying the second audio transmission.

In a further aspect, a computer-based method for authenticating audio interface devices is provided. The method is performed using an authentication server computing device including at least one processor in communication with at least one memory device. The method includes receiving a transaction request from an audio interface device, wherein the transaction request includes an account identifier of a payment, generating a first audio file including a first audio transmission, wherein the first audio transmission includes a primary security artifact and at least one secondary security artifact and the primary security artifact is an encoding of a one-time password, storing a reference data file including the first audio transmission, transmitting the first audio file to a verified user computing device associated with the account identifier, receiving a second audio file from the audio interface device, wherein the second audio file includes a second audio transmission, verifying the second audio transmission by comparing the second audio transmission to the reference data file including the primary security artifact and the at least one secondary security artifact, and authorizing the transaction based on verifying the second audio transmission.

DETAILED DESCRIPTION

Figure 1:
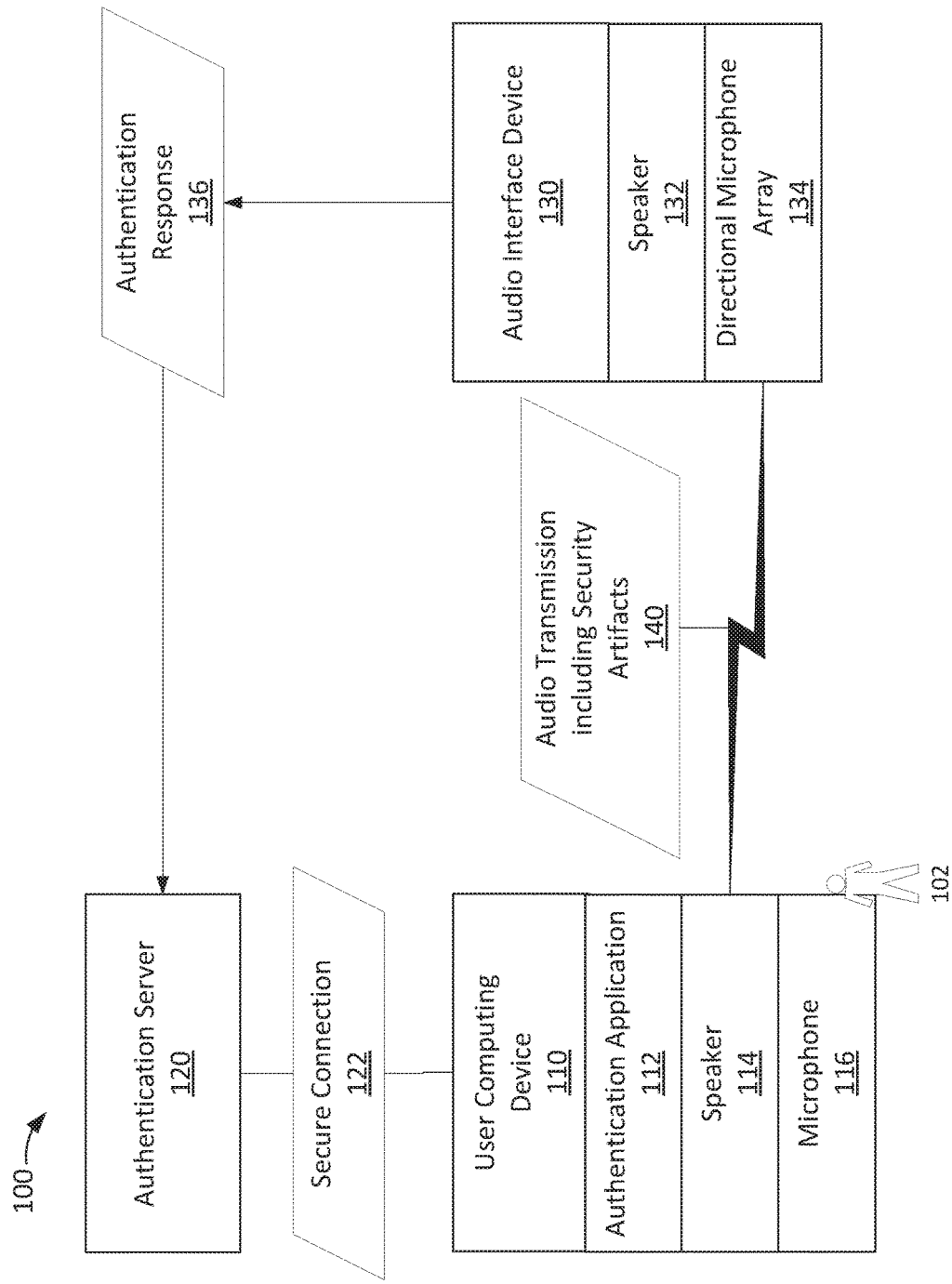
FIG. 1 is a schematic diagram illustrating an authentication system.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

Users may initiate purchase transactions using audio interface devices, such as an Amazon Alexa device (Alexa is a registered trademark of Amazon Technologies Inc., Reno, Nev.), or a Google Home device (Google Home is a registered trademark of Google LLC., Mountain View, Calif.). For example, a user may issue a voice command to purchase or reorder "olive oil" to their audio interface device. The user may pre-program the audio interface device to initiate a purchase transaction using a particular payment card, for example, as part of an account registration or set-up process. These purchase transactions may need to be authenticated to avoid accidental transactions and fraud. However, it may be impractical for a user to provide persistent passwords (e.g., an account password) to the audio interface device. Other users may overhear the password when it is spoken to the audio interface device, particularly when the audio interface device is located in a public or semi-public place where unknown people may be proximate to the user when the purchase transaction is made.

In the example embodiment, a one-time password is used to authenticate the user using audio interface device and the purchase transaction. In other words, the one-time password is used to authenticate the user (a "suspect consumer") of the audio interface device as a legitimate or "privileged" user of the payment card used to initiate the purchase transaction (e.g., a payment card linked to a user account of the audio interface device). The one-time password is encoded as an audio transmission that is played to the audio interface device and is received by the audio interface device using a microphone thereof. In the example embodiment, a user computing device, such as a smartphone, associated with the user may be activated to play the audio transmission including security artifacts, to thereby transmit the one-time password to the audio interface device. In other words, instead of the user verbally providing a persistent password, the user computing device provides the audio transmission including the one-time password. Thus, in one embodiment, the suspect consumer receives the one-time password as an audio file on their smart phone (or other user computing device), and the suspect consumer plays the one-time password so the audio interface device is able to "hear" or receive it at the microphone. As described further herein, the one-time password received at the audio interface device may then be compared to a stored "reference" version or sample of the one-time password, to confirm the suspect consumer is the legitimate accountholder.

The audio transmission is based on the one-time password. More specifically, the audio transmission is an encoded form of the one-time password. In one embodiment, the audio transmission includes synthesized speech reading digits of the one-time password. In another embodiment, the digits of the one-time password may correspond to specific tones, which together form the audio transmission. In the example embodiment, the audio transmission includes security artifacts. As used herein, security artifacts refer to elements of the audio transmission used in an authentication process for authentication of the purchase transaction initiated using the audio interface device. Security artifacts include at least the one-time password, but may further include elements such as a specifically selected frequency, amplitude, and/or timing of the audio transmission.

An authentication server is in communication with both the audio interface device and the user computing device. The authentication server receives a purchase transaction authentication request ("transaction request") associated with the purchase transaction initiated by the suspect consumer using the audio interface device. In the example embodiment, the authentication server receives the transaction request from the audio interface device. The authentication server generates a one-time password that can be used to authenticate the suspect consumer as a legitimate accountholder. The authentication server then provides a first audio file (including a first audio transmission of the one-time password) to a user computing device associated with the legitimate accountholder. The authentication server stores a reference data file including a reference copy of the first audio transmission. The suspect consumer uses the user computing device to play the first audio transmission (including the one-time password) to the audio interface device. The audio interface device generates a second audio file including a second audio transmission, the second audio transmission representing the received or "heard" first audio transmission, and transmits the second audio file to the authentication server. Subsequently, the authentication server may verify the second audio transmissions in the second audio file received from the audio interface device to authenticate the suspect consumer as the legitimate accountholder. Specifically, the authentication server compares the second audio transmission with the reference copy of the first audio transmission. In other words, the authentication server facilitates an authentication process between the user computing device and the audio interface device, and compares a one-time password provided to the user computing device (for transmission to the audio interface device as an audio transmission) with audio transmissions subsequently received from the audio interface device.

An authentication system including the authentication server in communication with the audio interface device is described herein. In some embodiments, the authentication server is a component of a payment card network processing payment transactions. The authentication server is in further communication with at least one user computing device, where a secure connection is established between the two devices (e.g., the user computing device may be previously authenticated to the authentication server, as described further herein).

The audio interface device is configured to respond to voice commands from a user, and includes a speaker and a directional microphone array. In the example embodiment, a user initiates a transaction, such as a product order or services request, using the audio interface device. Specifically, the user (e.g., the suspect consumer) issues a voice command to the audio interface device. For example, a voice command may include "assistant, reorder olive oil, baby formula, and diapers." The audio interface device is configured to analyze the command to initiate a purchase transaction based on the voice command, including transmitting a purchase transaction authorization request to the authentication server. A payment account or payment card may be linked to the user (i.e., the legitimate accountholder) and/or to the audio interface device. Accordingly, the purchase transaction authorization request includes an account identifier of the payment account used to initiate the transaction. The audio interface device, or the authentication server processing the transaction, may determine whether further authentication of the suspect consumer initiating the transaction is needed before processing the transaction.

In particular, a user computing device (also referred to herein as a "verified" user computing device) associated with the legitimate accountholder is leveraged to authenticate the purchase transaction initiated at/by audio interface device. In one embodiment, the user computing device includes a smartphone having a mobile banking application stored thereon that forms a secure communication with the authentication server. A standalone authentication device or application may also be used.

Figure 4:
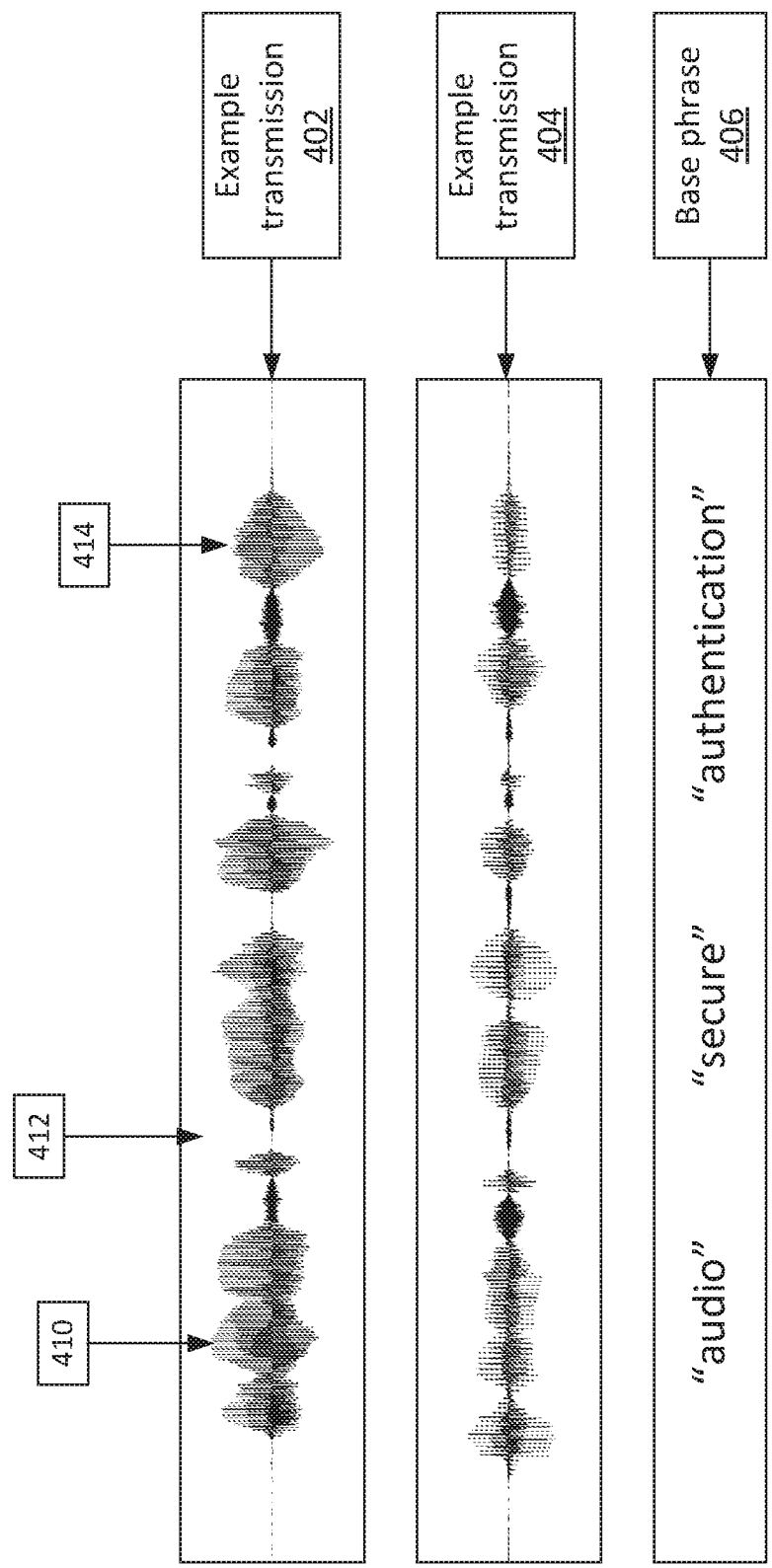
FIG. 4 is a waveform diagram illustrating primary and secondary security artifacts used in the authentication system shown in FIG. 1.

The authentication server dynamically generates an audio file including a first audio transmission, and transmits the audio file including the first audio transmission to the verified user computing device over a previously authenticated connection (e.g., using a Secure Socket Layer connection). The first audio transmission is generated based on a one-time password, such that replay attacks (e.g., from an unauthorized user overhearing the audio transmission) are prevented. More specifically, a time-based one-time password (TOTP) algorithm may be used to generate the audio transmission. The authentication server generates the first audio transmission with security artifacts, such as the content of the one-time password and/or various other characteristics of the first audio transmission (e.g., a frequency of the audio transmission and/or inaudible encoded data). In one embodiment, the first audio transmission includes the one-time password encoded therein using synthesized or prerecorded speech. In another embodiment, the first audio transmission may include a segment of a song, or another musical pattern, determined based on the one-time password. In yet another embodiment, the one-time password is encoded such that a user may not be able to hear/discern the one-time password within the first audio transmission. Details of the first audio transmission, including primary security artifacts (e.g., synthesized or prerecorded speech of the one-time password) and secondary security artifacts (e.g., a frequency of the first audio transmission), are shown in FIG. 4. The authentication server may provide the audio transmission in a compressed and/or encoded format in the audio file. The authentication server also generates and stores a reference data file including the first audio transmission or a copy thereof, also referred to as a "reference sample" of the first audio transmission.

In some embodiments, to initiate the authentication process, the audio interface device is configured to play an authentication prompt, such as a specific audio tone or pattern. The verified user computing device receives the authentication prompt at microphone therein. Receiving the authentication prompt may cause the verified user computing device to automatically activate the authentication application.

The user computing device, executing the authentication application, receives the audio file including the first audio transmission from the authentication server over a data network, such as the internet or a virtual private network. In some embodiments, the audio file is received from the authentication server in a compressed format. The verified user computing device is further configured to transmit or play, using a speaker, the first audio transmission including the security artifacts to the audio interface device. That is, in response to receiving the audio file including the first audio transmission, the verified user computing device plays the first audio transmission. The audio interface device receives the first audio transmission using the directional microphone array thereof. In certain embodiments, the authentication application on the verified user computing device is configured to determine a distance between the verified user computing device and the audio interface device. If the distance is greater than a certain threshold, which indicates the first audio transmission may not be properly or fully received by the audio interface device, the authentication application on the verified user computing device may prompt the user (e.g., the suspect consumer) to move closer to the audio interface device and/or adjust the volume of the speaker of the verified user computing device.

Figure 3:
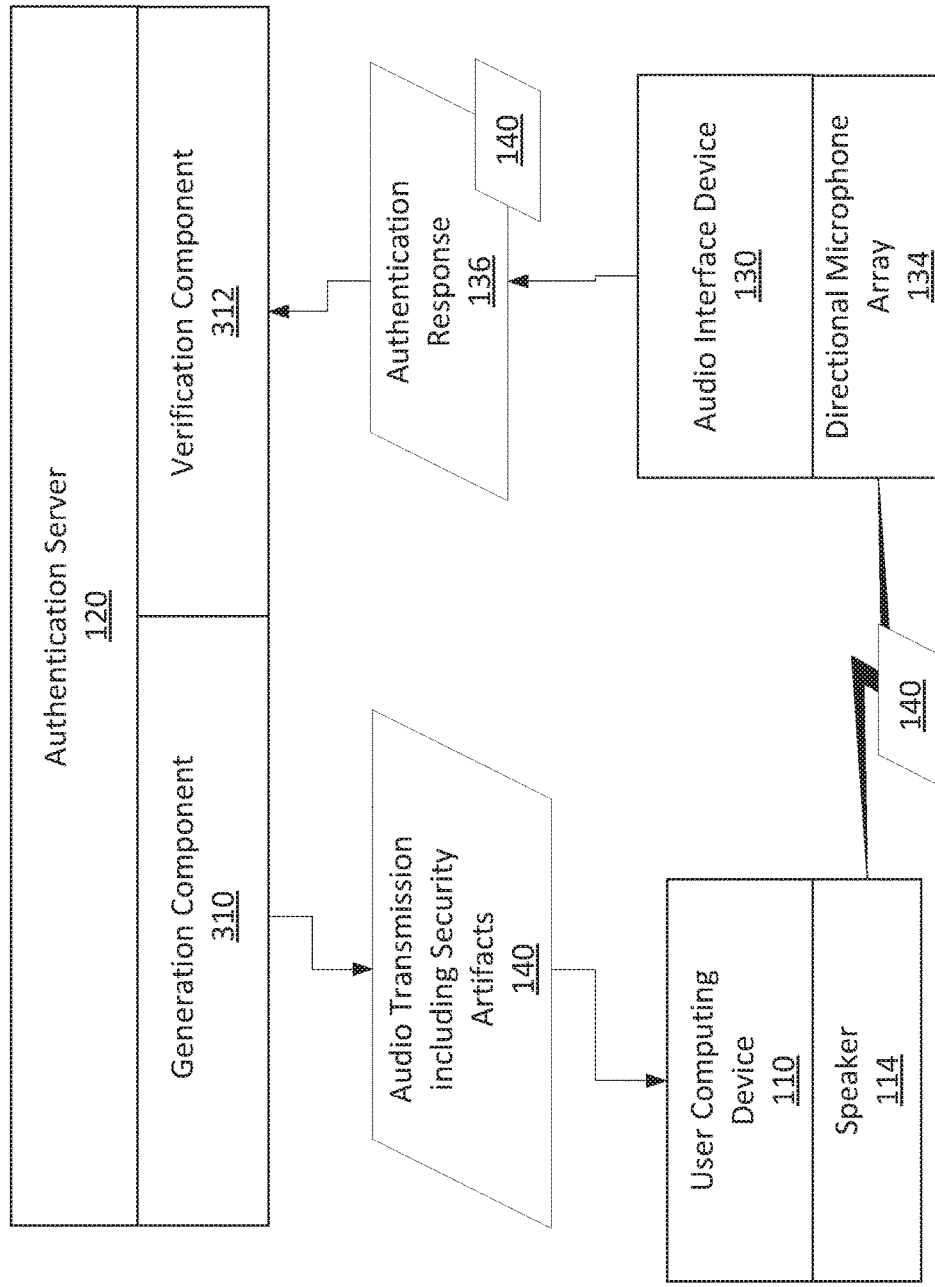
FIG. 3 is a data flow diagram illustrating the authentication system shown in FIG. 1 generating and verifying audio transmissions.

In response to receiving the first audio transmission, the audio interface device provides the audio transmission including the security artifacts as an authentication response to the authentication server. Specifically, the audio interface device generates an audio file including a second audio transmission, the second audio transmission representative of the first audio transmission provided to the audio interface device by the suspect consumer using the verified user computing device. The authentication server is configured to verify the received audio file by comparing the received second audio transmission to the first audio transmission in the stored reference data file (e.g., matching an encoded one-time password and secondary security artifacts between the first and second audio transmissions), and thereby verify the suspect consumer is the legitimate accountholder. The authentication server may subsequently determine if the associated purchase transaction initiated using the audio interface device should be authenticated. As shown in FIGS. 3 and 4, primary and secondary security artifacts are used to verify the second audio transmission. For example, data encoded as synthesized speech may be verified in addition to properties (e.g., frequency, amplitude, and timing) of the synthesized speech.

Various embodiments of audio transmissions and security artifacts are described herein. Security artifacts include primary and secondary security artifacts. The primary security artifacts, in the example embodiment, form the base of the audio transmission and are generated using a time based one-time password algorithm. The primary security artifacts may include audible numbers, and/or incomprehensible audio encoded data representing the OTP. For example, the one-time password may be encoded as the sound of audible numbers, or as a sequence of tones.

Secondary security artifacts include properties of the audio transmission, such as amplitude, frequency, and timing. In certain embodiments, the authentication server may manipulate these factors to create secondary security artifacts. In another embodiment, the secondary security artifacts may be merely identified observed from the audio transmission. For example, two different audio transmissions may sound like "five six eight" to a user, while the specific amplitudes and frequencies represent additional encoded data, used to verify the audio transmission.

After verifying the second audio transmission using the security artifacts in the first audio transmission stored in the reference data file, the authentication server may authenticate the transaction initiated at the audio interface device. For example, a payment card transaction may be authorized, an order may be placed, or a service may be requested.

The technical problems addressed by the disclosure include at least one of: (i) inability to perform high confidence authentications of transaction requests initiated using an audio interface device, (ii) data safety risks associated with using voice commands to initiate payment transaction authorization requests, (iii) requiring a secondary user interface to perform payment transactions and authenticate suspect consumers using an audio interface device, and (iv) data security risks associated with performing traditional authentication methods using an audio interface device.

The resulting technical benefits achieved by the systems and methods of the disclosure include at least one of: (i) reduced communication of persistent (e.g., not one-time) passwords, (ii) reduced accidental or fraudulent purchase transactions initiated on an audio interface device, (iii) completing high confidence authentications using audio interface devices without requiring a secondary user interface, and (iv) leveraging previously verified (e.g., registered, authenticated) user computing devices to increase the security of audio interface devices.

In one aspect, an authentication server computing device comprising at least one processor in communication with at least one memory device is provided. The processor is programmed to: (i) receive a transaction request from an audio interface device, the transaction request including an account identifier of a payment, (ii) generate a first audio file including a first audio transmission, the first audio transmission including a primary security artifact and at least one secondary security artifact, wherein the primary security artifacts is an encoding of a one-time password (iii) store a reference data file including the first audio transmission, (iv) transmit the first audio file to a verified user computing device associated with the account identifier, (v) receive a second audio file from the audio interface device, the second audio file including a second audio transmission, (vi) verify the second audio transmission by comparing the second audio transmission to the reference data file including the primary security artifact and the at least one secondary security artifact, and (vii) authorize the transaction based on verifying the second audio transmission.

The one-time password may be generated using a time-based one-time password algorithm. The first audio transmission, in some embodiments, includes synthesized speech based on the one-time password. Additionally or alternatively, the first audio transmission includes prerecorded sounds arranged based on the one-time password. In other embodiments, the first audio transmission includes characteristics not discernable by a user. For example, the first audio transmission may be outside of the normal human hearing range, short in duration, or at a low volume. The secondary security artifacts of the first audio transmission include at least one of frequency, amplitude, and timing. In certain embodiments, the secondary security artifacts are generated by the authentication server computing device by modifying at least one of frequency, amplitude, and timing of the first audio transmission. In the example embodiment, the transaction is a payment card transaction associated with a payment network. In some embodiments, the authentications server computing device is further configured to modify at least one of frequency, amplitude, and timing of the first audio transmission.

In another aspect, a non-transitory computer readable medium that includes executable instructions is provided, and when executed by an authentication server computing device comprising at least one processor in communication with at least one memory device, the executable instructions cause the authentication server computing device to: (i) receive a transaction request from an audio interface device, the transaction request including an account identifier of a payment account used by a suspect consumer to initiate a purchase transaction using the audio interface device, (ii) generate a first audio file including a first audio transmission, the first audio transmission including a primary security artifact and at least one secondary security artifact, wherein the primary security artifact is an encoding of a one-time password, (iii) store, in a memory, a reference data file including the first audio transmission, (iv) transmit the first audio file to a verified user computing device associated with the account identifier via an authentication application stored on the verified user computing device and registered with the authentication server computing device, (v) receive a second audio file from the audio interface device, the second audio file including a second audio transmission, the second audio transmission representative of the first audio transmission provided to the audio interface device by the suspect consumer using the verified user computing device, (vi) verify the second audio transmission by comparing the second audio transmission to the first audio transmission in the stored reference data file, including comparing the second audio transmission to the first audio transmission including the primary security artifact and the at least one secondary security artifact, and (vii) authorize the transaction based on verifying the second audio transmission and verifying the suspect consumer as a legitimate accountholder of the payment account.

The one-time password may be generated using a time-based one-time password algorithm. The first audio transmission, in some embodiments, includes synthesized speech based on the one-time password. Additionally or alternatively, the first audio transmission includes prerecorded sounds arranged based on the one-time password. In other embodiments, the first audio transmission includes characteristics not discernable by a user. For example, the first audio transmission may be outside of the normal human hearing range, short in duration, or at a low volume. The secondary security artifacts of the first audio transmission include at least one of frequency, amplitude, and timing. In the example embodiment, the transaction is a payment card transaction associated with a payment network. In certain embodiments, the executable instructions further cause the authentication server computing device to transmit an alert to the verified user computing device, the alert indicating the transaction request was authorized. In some embodiments, the executable instructions further cause the authentications server computing device to modify at least one of frequency, amplitude, and timing of the first audio transmission.

In another aspect, a computer-based method for authenticating audio interface devices, said method performed using an authentication server computing device comprising at least one processor in communication with at least one memory device. The method includes: (i) receiving a transaction request from an audio interface device, the transaction request including an account identifier of a payment account used by a suspect consumer to initiate a purchase transaction using the audio interface device, (ii) generating a first audio file, including a first audio transmission, the first audio transmission including a primary security artifact and at least one secondary security artifact, wherein the primary security artifact is an encoding of a one-time password, (iii) storing, in the memory, a reference data file including the first audio transmission, (iv) transmitting the first audio file to a verified user computing device associated with the account identifier via an authentication application stored on the verified user computing device and registered with the authentication server computing device, (v) receiving a second audio file from the audio interface device, the second audio file including a second audio transmission, the second audio transmission representative of the first audio transmission provided to the audio interface device by the suspect consumer using the verified user computing device, (vi) verifying the second audio transmission, by comparing the second audio transmission to the first audio transmission in the stored reference data file, including comparing the second audio transmission to the first audio transmission including the primary security artifact and the at least one secondary security artifact, (vii) authorizing the transaction based on verifying the second audio transmission and verifying the suspect consumer as a legitimate accountholder of the payment account.

The one-time password may be generated using a time-based one-time password algorithm. The first audio transmission, in some embodiments, includes synthesized speech based on the one-time password. Additionally or alternatively, the first audio transmission includes prerecorded sounds arranged based on the one-time password. In other embodiments, the first audio transmission includes characteristics not discernable by a user. For example, the first audio transmission may be outside of the normal human hearing range, short in duration, or at a low volume. The secondary security artifacts of the first audio transmission include at least one of frequency, amplitude, and timing. In the example embodiment, the transaction is a payment card transaction associated with a payment network. In certain embodiments, the method further includes transmitting an alert to the verified user computing device, the alert indicating the transaction request was authorized. In some embodiments, the method includes modifying at least one of frequency, amplitude, and timing of the first audio transmission.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating authentication system 100 authorizing a transaction based on verifying an audio transmission. User 102 interacts with audio interface device 130 using voice commands. User 102 may be considered a suspect consumer, such that purchase transactions initiated by user 102 may need to be authenticated to verify that user 102 is a legitimate accountholder of a payment account used to initiate the purchase transactions. Audio interface device 130 includes speaker 132 and directional microphone array 134. For example, user 102 may request a service or place an order using a voice command. Overall, user 102 may initiate operations on audio interface device 130 that require authentication. However, audio interface device 130 may be ill-suited for authenticating using conventional methods. For example, it may be inconvenient or insecure for user 102 to provide authentication data using voice commands. Authentication system 100 authenticates transactions initiated at/on audio interface device 130.

In response to attempting an operation requiring authentication (e.g., placing an order), audio interface device 130 is configured to receive an audio transmission using directional microphone array 134. Audio interface device 130 is further configured to store the received audio transmission as an audio file. Specifically, user computing device 110, in communication with authentication server 120, plays audio transmission including security artifacts 140, and the audio transmission is stored as an audio file by audio interface device 130.

In some embodiments, audio interface device 130 may use speaker 132 to provide an authentication prompt to user computing device 110. Audio interface device 130 may play a specific tone, phrase, or sound to indicate authentication is required. In some embodiments, user computing device 110 may receive the authentication prompt using microphone 116, and automatically launch authentication application 112. Optionally, authentication application 112 may automatically initiate audio transmission 140 in response to the authentication prompt.

Authentication server 120 generates and transmits a first audio file, including a first audio transmission having security artifacts 140, to user computing device 110. User computing device 110 has a secure connection 122 to authentication server 120. In other words, authentication server 120 provides the audio transmission to user computing device 110 as a first audio file, for subsequent audio transmission to audio interface device 130. In certain embodiments, user computing device 110 includes an authentication application 112 configured to request an encoded (e.g., compressed, stored) format of audio transmission 140 from authentication server 120. In other embodiments, authentication server 120 transmits token data (e.g., a one-time-password) to user computing device 110, and authentication application 112 is configured to generate audio transmission 140 based on the token data. For example, authentication application 112 may be a mobile banking application, a mobile wallet application, or a one-time-password application. In the example embodiment, user 102 has previously completed a registration process on user computing device 110.

User computing device 110 transmits, using speaker 114, audio transmission including security artifacts 140 to audio interface device 130. Audio interface device 130 receives audio transmission 140 using directional microphone array 134.

Audio interface device 130 includes audio transmission 140 in an authentication response 136 to authentication server 120. Authentication server 120 is configured to validate authentication response 136. More specifically, authentication server 120 may verify any number of security artifacts in audio transmission 140, as shown in FIG. 4. For example, authentication server 120 may verify a one-time password encoded in audio transmission 140.

Figure 2:
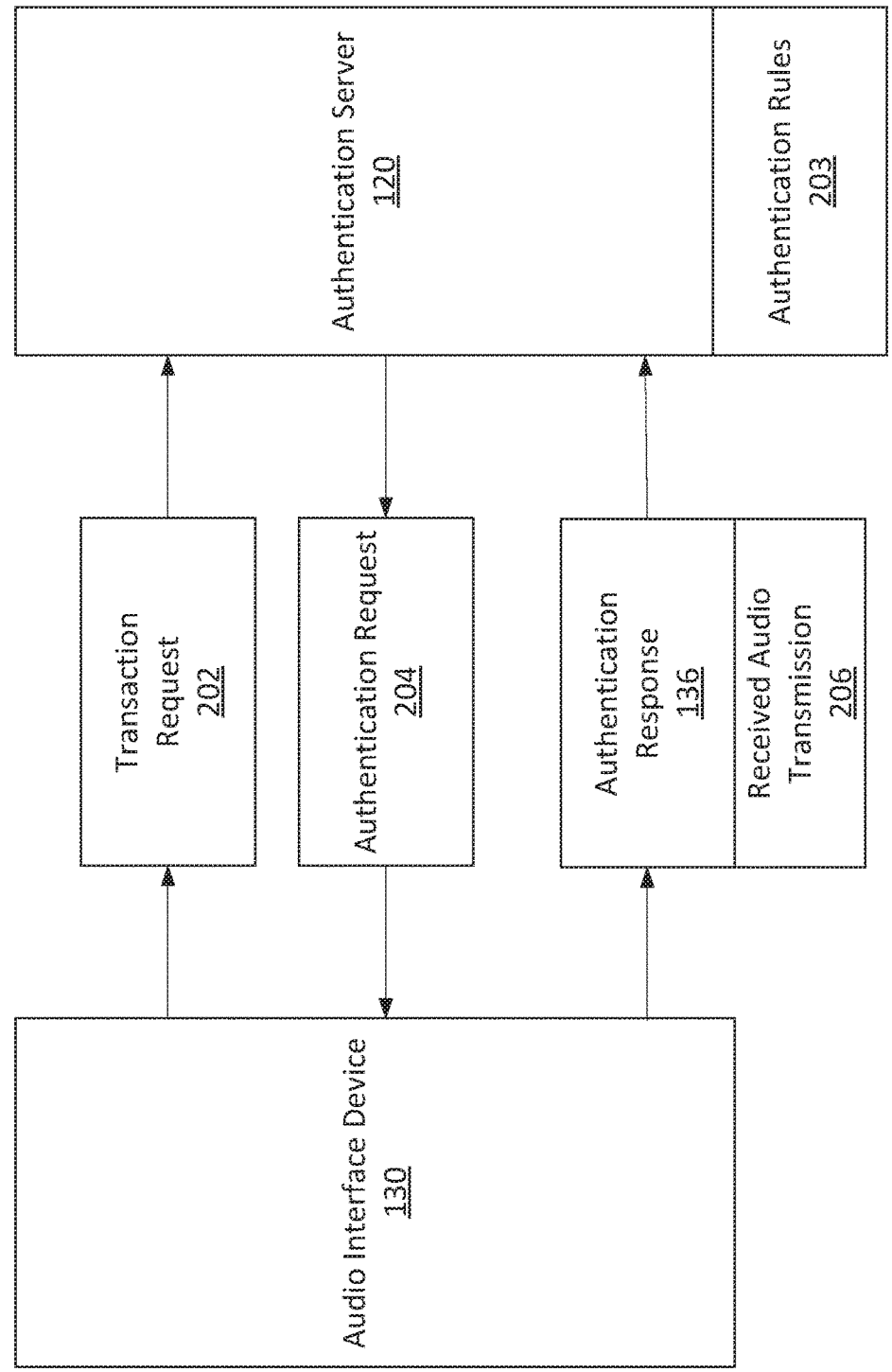
FIG. 2 is a data flow diagram illustrating the authentication system shown in FIG. 1 authorizing a transaction based on verifying an audio transmission.

FIG. 2 is a data flow diagram illustrating the authentication system 100 (shown in FIG. 1) generating and verifying audio transmissions.

Audio interface device 130 transmits transaction request 202 to authentication server 120. Transaction request 202 may include a payment card transaction, a product order, a service request, and the like. For example, transaction request 202 may be initiated based on a voice command from user 102. Authentication server 120 determines if transaction request 202 requires authentication, to determine if user 102 is an authorized accountholder. For example, authentication rules 203 may specify authentication is required for any received payment card transaction including a transaction amount over $100. Transaction request 212 may include an account identifier of a payment account, where the payment account has been preregistered with audio interface device 130.

In response to transaction request 202, authentication server 120 transmits authentication request 204 to audio interface device 130. Audio interface device 130 may play an authentication prompt in response to receiving authentication request 204, as described in FIG. 1. Audio interface device 130 is configured to receive audio transmission including security artifacts 140 (as shown in FIG. 1) from user computing device 110, and store a second audio file including the received audio transmission.

Audio interface device 130 transmits authentication response 136 to authentication server 120, including received audio transmission 206 as an audio file. Authentication response 136 is used by authentication server 120 to verify audio interface device 130 is in communication with, and in proximity to, trusted user computing device 110. In some embodiments, authentication response 136 may include a decoded, compressed, or aggregated form of audio transmission 140.

FIG. 3 is a data flow diagram illustrating authentication server 120 generating and verifying audio transmissions. Authentication server 120 includes generation component 310 and verification component 312. Generation component 310 generates a first audio file including audio transmission 140, and provides it to user computing device 110. The first audio file, including audio transmission 140, may be stored as a reference audio file at authentication server 120. Verification component verifies audio transmissions received by audio interface device 130 by comparing them to stored reference audio files. In other words, authentication server 120 generates an audio transmission based authentication challenge to verify authenticate a suspect consumer as an authorized accountholder.

In the example embodiment, generation component 310 generates a first audio file, including audio transmission having security artifacts 140. In other embodiments, generation component 310 generates a compressed and/or encoded form of audio transmission 140. For example, generation component may specify the structure and content of audio transmission 140, where user computing device is instructed to generate the audio data used for the transmission. After generating the first audio file, authentication server 120 may store the first audio file as a reference audio file. The first audio file and/or the reference audio file, may be stored in volatile memory (e.g., read access memory), a key-object store, a memory cache, and the like.

Generation component 310 is configured to encode any number of security artifacts into audio transmission 140. Security artifacts include primary and secondary artifacts. Overall, primary security artifacts include encoded data which may be algorithmically verified, and secondary security artifacts include properties of audio transmission 140 which may be verified (e.g., frequency, amplitude, timing).

In one embodiment, primary artifacts may be human comprehensible. The primary security artifacts may form a base portion of audio transmission 140. For example, audio transmission 140 may sound to user 102 (shown in FIG. 1) as "seven eight nine", where the data string '789' is used as primary security artifacts by verification component 312. Primary security artifacts may include, but are not limited to, words, phrases, and number sequences. As another example, audio transmission may sound to user 120 as "alpha bravo charlie", where the data string 'abc' is used as primary security artifacts.

In another embodiment, primary artifacts may not be human comprehensible. The primary artifacts may be encoded digitally. For example, touch tone number encoding may be used or Analog Simultaneous Voice and Data (ASVD) encoding. Additionally or alternatively, the primary artifacts may be transmitted at a frequency, rate, or amplitude which is not distinguishable to user 102.

In the example embodiment, generation component 310 dynamically determines the primary security artifacts. For example, the primary security artifacts may be an encoding of a one-time-password generated using a time based one-time password (TOTP) algorithm. In other embodiments, the primary artifacts may be preset (e.g., a recognizable phrase or pattern), and secondary security artifacts may be used by verification component 312 to verify audio transmission 140.

Secondary security artifacts include properties of audio transmission 140, such as the frequency, amplitude, and timing. More specifically, the frequencies and timing of patterns in audio transmission 140 may be recorded with high accuracy by directional microphone array 134. Verification component 312 is configured to compare any number of secondary security artifacts in authentication response 136 to audio transmission 140 as provided by generation component 310.

In some embodiments, generation component 310 generates audio transmission 140 in two phases. Generation component 310 may first generate the primary security artifacts, and then modify the initial audio transmission to include specific secondary security artifacts. More specifically, the frequency, amplitude, and timing, of the audio transmission may be modified to encode data. For example, deviations from an average frequency and controlled changes in amplitude may be used. The secondary security artifacts may be preset, or dynamically generated. For example, a consistent pattern of modification may be used to verify audio transmission 140 was generated by authentication server 120. As another example, additional elements of a one-time password may be encoded as secondary security artifacts.

In other embodiments, generation component 310 does not specifically modify audio transmission 140 to include secondary security artifacts, and instead the frequency, amplitude, and timing of the audio transmission including the primary security artifacts may be used. Greater detail of the primary and secondary security artifacts is shown in FIG. 4.

User computing device 110, after receiving the first audio file, plays the included audio transmission to audio interface device 130. More specifically, user computing device 110, using speaker 114, transmits audio transmission including security artifacts 140 to audio interface device 130. Audio interface device 130 receives audio transmission 140 using directional microphone array 134. Directional microphone array 134 is further described in FIG. 7. Audio interface device 130 is configured to generate a second audio file, including the received audio transmission 140, and transmit the second audio file to authentication server 120.

Authentication server 120 verifies the second audio file, including the received audio transmission 140, by comparing the received audio transmission 140 to the stored reference file using the security artifacts. Verification component 312 is configured to receive authentication response 136 from audio interface device 130, and to verify audio transmission 140. More specifically, verification component 312 is configured to verify any number of security artifacts included in authentication response 136, and compare authentication response 136 to the audio transmission generated by generation component 310.

Overall, authentication server 120 verifies the suspect consumer (e.g., user 102 shown in FIG. 1) is an authorized accountholder, and enabled to initiate transaction requests. In response to the verification, verification component 312 may authorize transaction request 202 (shown in FIG. 2). Verification of primary and secondary security artifacts, using verification component 312, is shown in further detail in FIG. 4. In certain embodiments, in response to authorizing the transaction, authentication server 120 transmits an alert to user computing device 110 indicating the transaction was authorized.

FIG. 4 is a waveform diagram illustrating primary and secondary security artifacts, as generated by authentication server 120 (shown in FIG. 1). Two example transmissions are depicted, example transmissions 404 and 402. In the example embodiment, example transmissions 402 and 404 may sound like two different voices saying "audio secure authentication." The base phrase, 406 may be used as primary security artifacts. For example, the phrase "audio secure authentication" may be determined based on a one-time password. The primary security artifacts, 'audio', 'secure', and 'authentication', may be decoded by verification component 312 (shown in FIG. 3) as a one-time password.

Base phrase 406 illustrates a primary security artifact. Secondary security artifacts 410, 412, and 414 are illustrated using waveforms of example transmissions 402 and 404. In other words, example transmissions 402 include the same primary security artifact (e.g., include the same encoded one-time password), while having distinct secondary security artifacts.

Waveforms of example transmissions 402 and 404 are shown to illustrate secondary security artifacts 410, 412, and 414.

The segment associated with secondary security artifact 410 may sound generally like 'audio' to user 102. However, transmissions 402 and 404 have significantly different audio frequency patterns. Verification component 312 may compare the exact frequencies associated with secondary security artifact 410 to verify audio transmissions 402 and 404.

Secondary security artifact 412 defines the timing between components of the audio transmission, and may sound like silence between words to user 102. Verification component 312 may analyze the exact timing of transmissions 402 and 404, including any pauses.

Secondary artifact 414 is directed to the amplitude of example transmissions 402 and 404. For example, changes in amplitude may be used by verification component 312.

Figure 5:
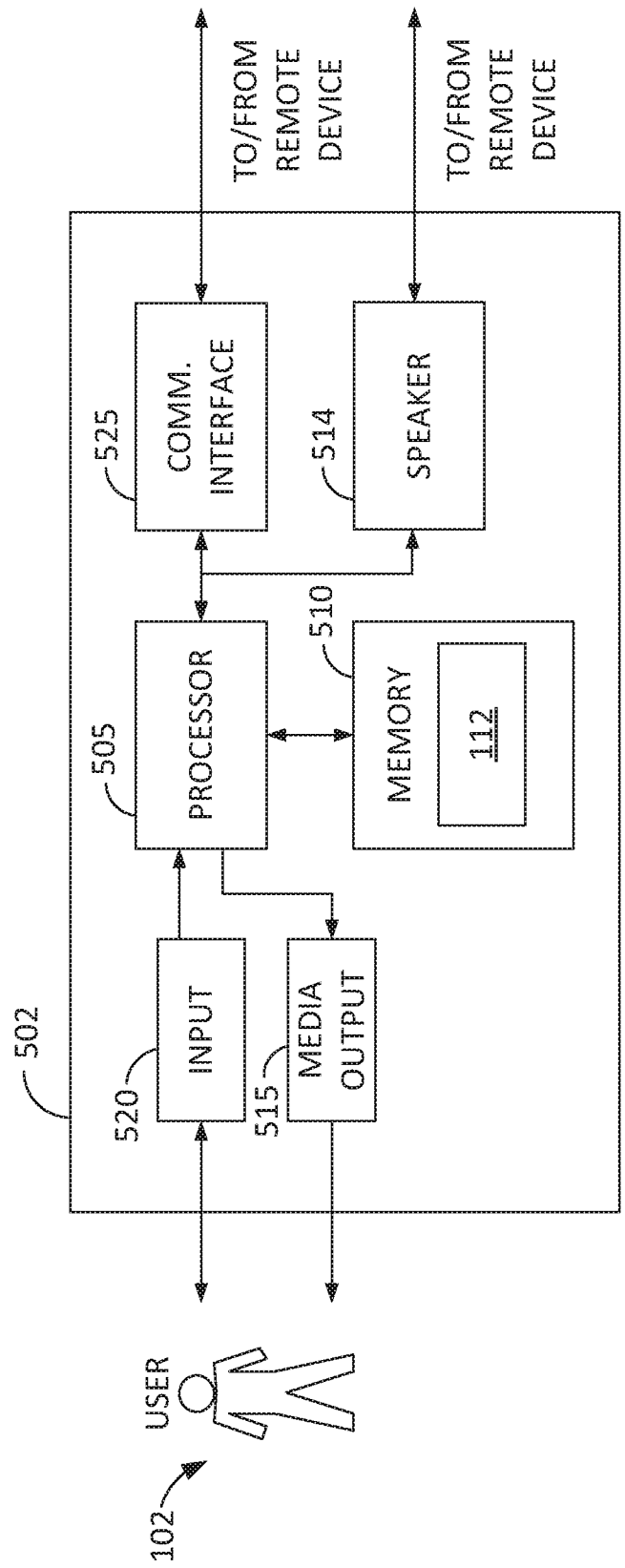
FIG. 5 illustrates an example user computing device of the authentication system shown in FIG. 1.

FIG. 5 depicts a user computing device 502 that may be used to implement user computing device 110 (shown in FIG. 1). Computing device 502 includes a processor 505 for executing instructions. In some embodiments, executable instructions are stored in a memory area 510. Processor 505 includes one or more processing units (e.g., in a multi-core configuration allowing information such as executable instructions and/or other data to be stored and retrieved. Memory area 510 includes one or more computer-readable media.

Computing device 502 also includes at least one media output component 515 for presenting information to a user 530. Media output component 515 is any component capable of conveying information to user 102. In some embodiments, media output component 515 includes an output adapter, such as a video adapter and/or an audio adapter. An output adapter is operatively coupled to processor 505 and operatively coupleable to an output device such as a display device (e.g., a liquid crystal display (LCD), organic light emitting diode (OLED) display, cathode ray tube (CRT), or "electronic ink" display). In some embodiments, media output component 515 is configured to present an interactive user interface (e.g., a web browser or client application) to user 530. Computing device 502 includes speaker 514, an audio output device.

Computing device 502 also includes a communication interface 525, which is communicatively coupleable to a remote device, such as authentication server 120 (shown in FIG. 1). Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Authentication application 112 is stored in memory 510, and is executed by processor 505. In the example embodiment, authentication application 112 includes instructions to establish a secure connection with authentication server 120 using comm. Interface 525. Additionally, authentication application is configured to operate speaker 514 to transmit audio transmissions. In other words, authentication application 112 may establish a connection with audio interface device 130 (shown in FIG. 1) using speaker 114. Memory area 510 may additionally store computer-readable instructions for providing a user interface to user 530 via media output component 515 and, optionally, receiving and processing input from input device 520. A user interface may include, among other possibilities, a web browser and a client application.

Figure 6:
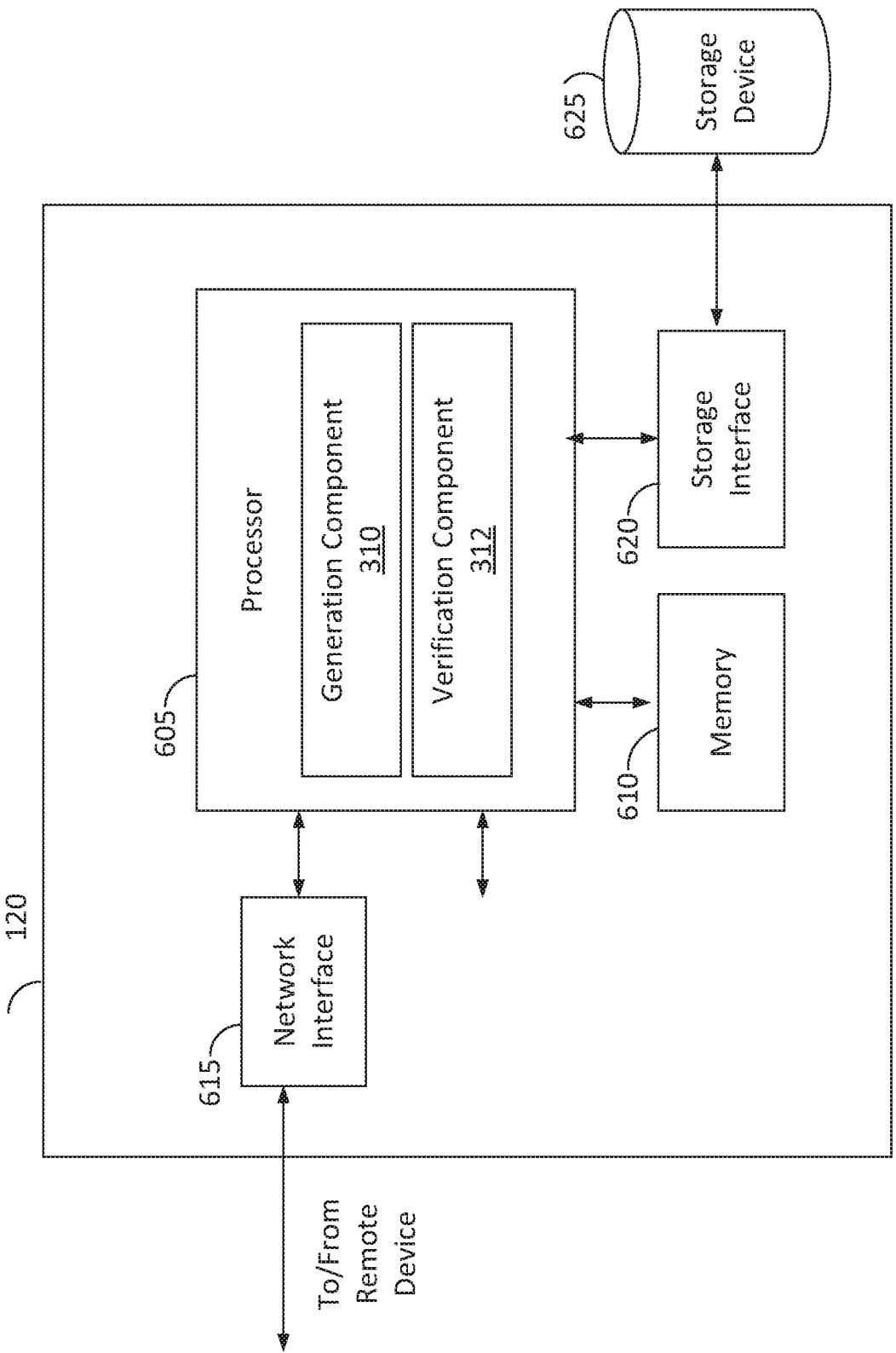
FIG. 6 illustrates an example authentication server computing device of the authentication system shown in FIG. 1.

FIG. 6 depicts an example configuration a processor 605 for executing instructions. Instructions are stored in a memory area 610, for example. Processor 605 includes one or more processing units (e.g., in a multi-core configuration, processor 605 is operable to execute generation component 310 and verification component 312. Components 310 and 312 may include specialized instruction sets, coprocessors, and/or kernel extensions.

Generation component 310 may generate secret values (e.g., one-time passwords) and subsequently generate audio transmissions including security artifacts based on the secret values. More specifically, generation component 310 may generate audio transmissions using time based one-time password (TOTP) algorithms. Generation component 310 may further include modifying audio transmissions to include secondary security artifacts (e.g., frequency, timing, amplitude modifications), as shown in FIG. 4.

Verification component 312 is configured to verify audio transmissions (and compressed/decoded audio transmissions) received from audio interface device 130 (shown in FIG. 1). In one embodiment, verification component 312 decodes the audio transmission including security artifacts to retrieve a one-time password, verifies the one-time password, and additionally verifies any number of secondary security artifacts (e.g., properties of the audio transmission)).

Processor 605 is operatively coupled to a first communication (i.e., network) interface 615. In some embodiments, first communication interface 615 is configured to enable authentication server 120 to communicate with remote device(s) such as user computing device 110. In some embodiments, communication interface 615 is a virtual interface. In certain embodiments, communication interface 615 is associated with a respective network address, such as an IP ("internet protocol") address. In other embodiments, communication interface 615 is associated with physical network links. For example, communication interface 615 may receive network packets from remote devices via Ethernet, using a switching device.

Processor 605 is operatively coupled to a storage device 625. Storage device 625 is any computer-operated hardware suitable for storing and/or retrieving data. In some embodiments, storage device 625 is integrated in authentication server 120. For example, authentication server 120 may include one or more hard disk drives as storage device 625. In other embodiments, storage device 625 is external to identity authentication sever 120 and is accessed by a plurality of authentication severs 120. For example, storage device 625 may include multiple storage units such as hard disks or solid state disks in a redundant array of inexpensive disks (RAID) configuration 625 may include a storage area network (SAN) and/or a network attached storage (NAS) system.

In some embodiments, processor 605 is operatively coupled to storage device 625 via a storage interface 620. Storage interface 620 is any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 625.

Memory areas 510 (shown in FIG. 5) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 7:
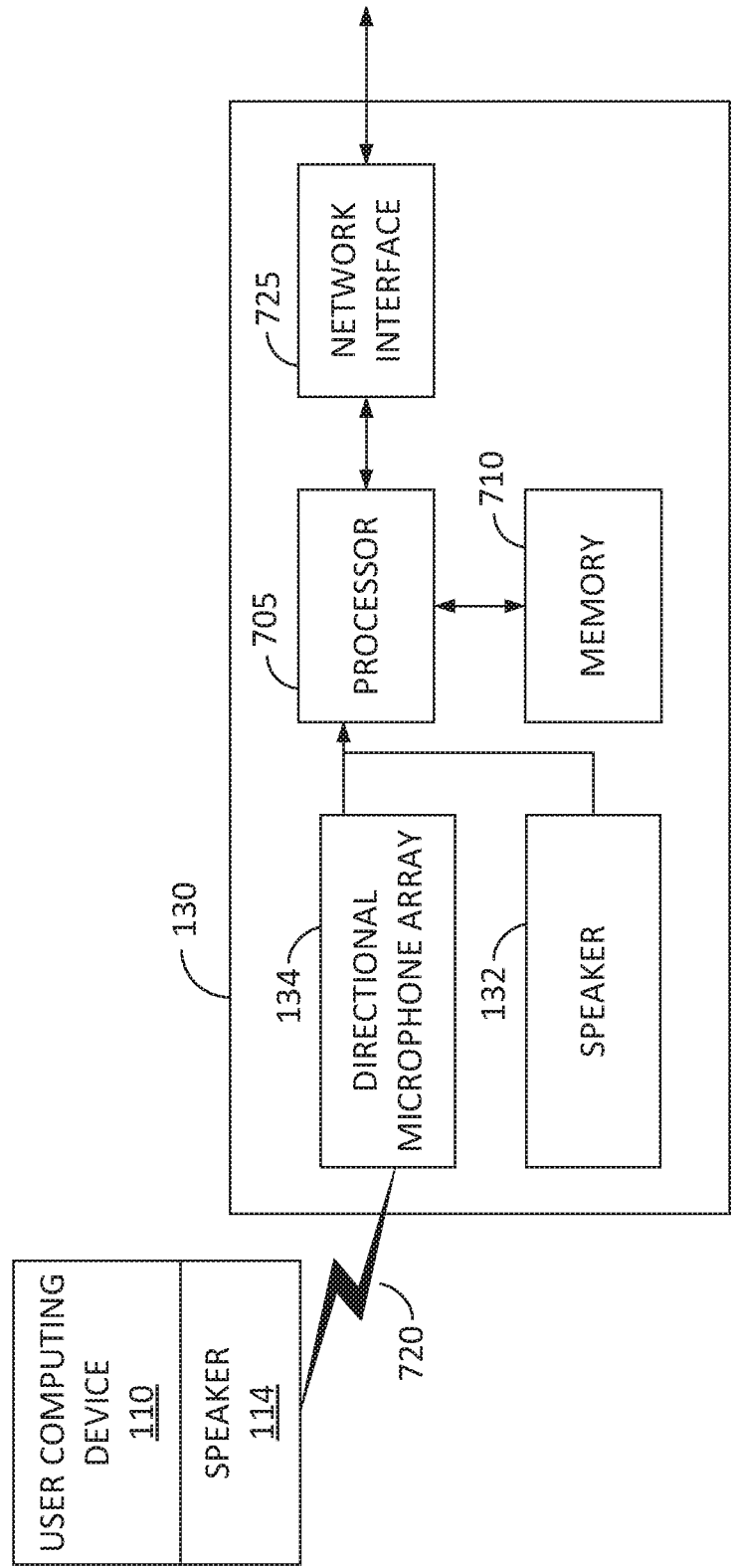
FIG. 7 illustrates an example audio interface device of the authentication system shown in FIG. 1.

FIG. 7 depicts audio interface device 130 (shown in FIG. 1). Audio interface device 130 includes a processor 705 for executing instructions. In some embodiments, executable instructions are stored in a memory area 710. Processor 705 includes one or more processing units (e.g., in a multi-core configuration allowing information such as executable instructions and/or other data to be stored and retrieved. Memory area 710 includes one or more computer-readable media.

In the example embodiment, audio interface device 130 includes directional microphone array 134. Directional microphone array 134 includes at least two microphones adapted for long range audio reception. The array of directed microphones is directed such that audio can be detected across any direction while also allowing for audio from a specific direction to be isolated. In alternate embodiments, audio interface device 130 may include a single microphone, such as a microphone suited for voice calls.

Directional microphone array 134 receives audio transmission including security artifacts 720 from speaker 114 of user computing device 110. In other words, audio interface device 130 establishes a data connection with user computing device 110 over an audio channel using directional microphone array 134 and, optionally, speaker 132. Processor 705 may control directional microphone array 134 to store audio transmission 720 in memory 710, and subsequently transmit audio transmission 720 to authentication sever 120 using network interface 725.

Audio interface device 130 also includes a communication interface 725, which is communicatively coupleable to a remote device, such as authentication server 120 (shown in FIG. 1). Communication interface 725 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Figure 8:
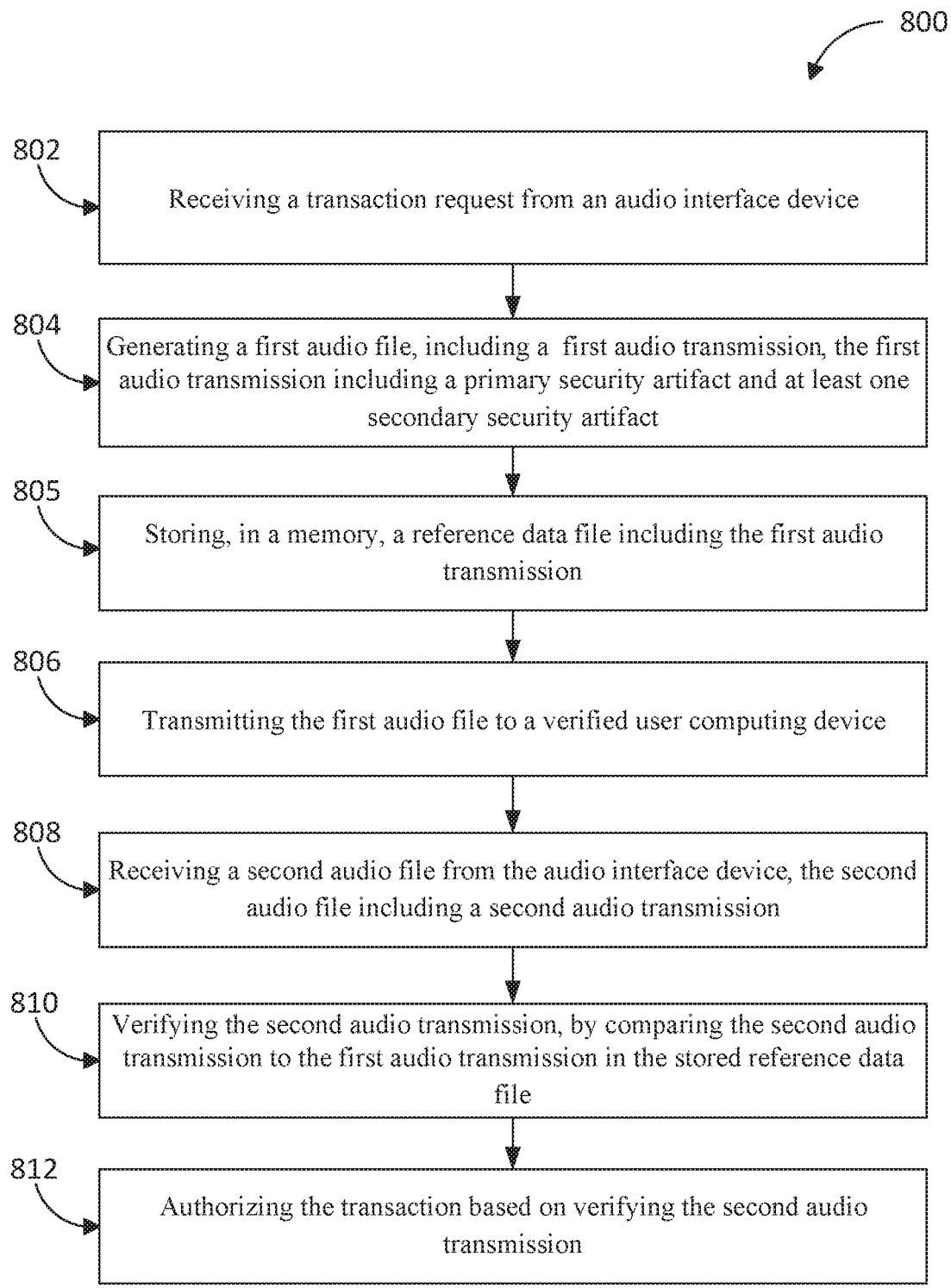
FIG. 8 is a flowchart illustrating an example method for authenticating an audio interface device, using the authentication system shown in FIG. 1.

FIG. 8 is a flowchart illustrating an example method for authenticating an audio interface device, using the authentication system shown in FIG. 1. Process 800 includes receiving 802 a first transaction request from an audio interface device, the transaction request including an account identifier of a payment account used by a suspect consumer to initiate a purchase transaction using the audio interface device. The transaction may be a payment transaction initiated by the audio interface device in response to a voice command from the suspect consumer. The payment account identifier may be stored by the audio interface device as a result of an enrollment or preregistration process, where the user connects the audio interface device to a payment account and/or digital wallet. The voice command may include ordering a product or requesting a service. To authenticate the transaction request, process 800 includes generating 804 a first audio file, including a first audio transmission, the first audio transmission including a primary secondary artifact and at least one secondary security artifact, and the primary security artifact is an encoding of a one-time password, storing 805 a reference data file including the first audio transmission in the memory, and transmitting 806 the first audio file to a verified user computing device via an authentication application stored on the verified user computing device and registered with the authentication server computing device. In other words, a previously authenticated user computing device is leveraged to authenticate the transaction initiated on the audio interface device. The primary security artifact is an encoding of a one-time password. For example, a one-time password may be encoded using synthesized speech or a combination of prerecorded sounds.

The user computing device transmits the first audio transmission to the audio interface device, where the audio interface device receives the transmission using a directional microphone array. In other words, the audio interface device establishes an ad hoc connection over an audio channel with the mobile computing device.

Method 800 includes receiving 808 a second audio transmission file from the audio interface device, the second audio file including a second audio transmission, the second audio transmission representative of the first audio transmission provided to the audio interface device by the suspect consumer using the verified user computing device. Method 800 further includes verifying 810 the second audio transmission by comparing the second audio transmission to the first audio transmission in the stored reference data file. More specially, verifying 810 may include comparing the second audio transmission to the first audio transmission including the primary security artifact and the at least one secondary security artifact. In response to verifying 810, method 800 includes authorizing 812 the transaction based on verifying the second audio transmission, and verifying the suspect consumer as a legitimate accountholder of the payment account. In certain embodiments, method 800 may further include transmitting an alert to the verified mobile computing device, indicating the transaction was authorized.

As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An authentication server computing device in network communication with an audio interface device and a verified user computing device, the authentication server computing device comprising at least one processor in communication with at least one memory device, the processor programmed to:
   receive a transaction request from the audio interface device, the transaction request including an account identifier of a payment account used by a suspect consumer to initiate a purchase transaction using the audio interface device;
   generate a first audio file including a first audio transmission, the first audio transmission including a primary security artifact and at least one secondary security artifact, wherein the primary security artifact is an encoding of a one-time password;
store, in the memory, a reference data file including the first audio transmission;
transmit the first audio file and instructions to the audio interface device, wherein the instructions cause the audio interface device to (i) play a specific audio tone that prompts the verified user computing device to automatically activate an authentication application stored on the verified user computing device and registered with the authentication server computing device and (ii) transmit the first audio file including the first audio transmission to the verified user computing device, the verified user computing device associated with a legitimate accountholder of the payment account associated with the account identifier;
receive a second audio file from the audio interface device in response to the activated authentication application of the verified user computing device automatically playing the first audio transmission for the audio interface device, the second audio file including a second audio transmission;
verify the second audio transmission by comparing the second audio transmission to the first audio transmission in the stored reference data file, including electronically comparing the second audio transmission to the first audio transmission to match the primary security artifact and the at least one secondary security artifact of the first and second audio transmissions;
verify the suspect customer as the legitimate accountholder of the payment account based on verifying the second audio transmission; and
authorize the transaction based on the verification of the second audio transmission and the suspect consumer being the legitimate accountholder of the payment account.

2. The authentication server computing device of claim 1, wherein the one-time password is generated using a time-based one-time password algorithm.

3. The authentication server computing device of claim 1, wherein the first audio transmission includes synthesized speech based on the one-time password.

4. The authentication server computing device of claim 1, wherein the first audio transmission includes prerecorded sounds arranged based on the one-time password.

5. The authentication server computing device of claim 1, wherein the first audio transmission includes characteristics not discernable by a user.

6. The authentication server computing device of claim 1, wherein the secondary security artifacts of the first audio transmission include at least one of frequency, amplitude, and timing.

7. The authentication server computing device of claim 6, wherein the secondary security artifacts are generated by the authentication server computing device by modifying the at least one of frequency, amplitude, and timing of the first audio transmission.

8. The authentication server computing device of claim 1, wherein the processor is further programmed to:
transmit an alert to the verified user computing device, the alert indicating the transaction request was authorized.

9. A non-transitory computer readable medium that includes executable instructions, wherein when executed by an authentication server computing device in network communication with an audio interface device and a verified user computing device and comprising at least one processor in communication with at least one memory device, the executable instructions cause the authentication server computing device to:
receive a transaction request from the audio interface device, the transaction request including an account identifier of a payment account used by a suspect consumer to initiate a purchase transaction using the audio interface device;
generate a first audio file including a first audio transmission, the first audio transmission including a primary security artifact and at least one secondary security artifact, wherein the primary security artifact is an encoding of a one-time password;
store, in a memory, a reference data file including the first audio transmission;
transmit the first audio file and instructions to the audio interface device, wherein the instructions cause the audio interface device to (i) play a specific audio tone that prompts the verified user computing device to activate an authentication application stored on the verified user computing device and registered with the authentication server computing device and (ii) transmit the first audio file including the first audio transmission to the verified user computing device, the verified user computing device associated with a legitimate accountholder of the payment account associated with the account identifier;
receive a second audio file from the audio interface device in response to the activated authentication application of the verified user computing device automatically playing the first audio transmission for the audio interface device, the second audio file including a second audio transmission;
verify the second audio transmission by comparing the second audio transmission to the first audio transmission in the stored reference data file, including electronically comparing the second audio transmission to the first audio transmission to match the primary security artifact and the at least one secondary security artifact of the first and second audio transmissions;
verify the suspect customer as the legitimate accountholder of the payment account based on verifying the second audio transmission; and
authorize the transaction based on the verification of the second audio transmission and the suspect consumer being the legitimate accountholder of the payment account.

10. The non-transitory computer readable medium of claim 9, wherein the one-time password is generated using a time-based one-time password algorithm.

11. The non-transitory computer readable medium of claim 9, wherein the first audio transmission includes synthesized speech based on the one-time password.

12. The non-transitory computer readable medium of claim 9, wherein the first audio transmission includes characteristics not discernable by a user.

13. The non-transitory computer readable medium of claim 9, wherein the secondary security artifacts of the first audio transmission include at least one of frequency, amplitude, and timing.

14. The non-transitory computer readable medium of claim 13, wherein the secondary security artifacts are generated by the authentication server computing device by modifying the at least one of frequency, amplitude, and timing of the first audio transmission.

15. The non-transitory computer readable medium of claim 9, wherein executable instructions further cause the authentication server computing device to:
transmit an alert to the verified user computing device, the alert indicating the transaction request was authorized.

16. A computer-based method for authenticating a user carrying out a transaction using an audio interface device, said method performed using an authentication server computing device in network communication with the audio interface device and a verified user computing device, the authentication server computing device comprising at least one processor in communication with at least one memory device, said method comprising:
receiving a transaction request from the audio interface device, the transaction request including an account identifier of a payment account used by a suspect consumer to initiate a purchase transaction using the audio interface device;
generating a first audio file, including a first audio transmission, the first audio transmission including a primary security artifact and at least one secondary security artifact, wherein the primary security artifact is an encoding of a one-time password;
storing, in the memory, a reference data file including the first audio transmission;
transmitting the first audio file and instructions to the audio interface device, wherein the instructions cause the audio interface device to (i) play a specific audio tone that prompts the verified user computing device to activate an authentication application stored on the verified user computing device and registered with the authentication server computing device and (ii) transmit the first audio file including the first audio transmission to the verified user computing device, the verified user computing device associated with a legitimate accountholder of the payment account associated with the account identifier;
receiving a second audio file from the audio interface device in response to the activated authentication application of the verified user computing device automatically playing the first audio transmission for the audio interface device, the second audio file including a second audio transmission;
verifying the second audio transmission, by comparing the second audio transmission to the first audio transmission in the stored reference data file, including electronically comparing the second audio transmission to the first audio transmission to match the primary security artifact and the at least one secondary security artifact of the first and second audio transmissions;
verifying the suspect customer as the legitimate accountholder of the payment account based on verifying the second audio transmission; and
authorizing the transaction based on the verification of the second audio transmission and the suspect consumer being the legitimate accountholder of the payment account.

17. The method of claim 16, wherein the secondary security artifacts of the first audio transmission include at least one of frequency, amplitude, and timing.

18. The method of claim 17, wherein the secondary security artifacts are generated by the authentication server computing device by modifying the at least one of frequency, amplitude, and timing of the first audio transmission.

19. The method of claim 16, wherein said method further comprises:
transmitting an alert to the verified user computing device, the alert indicating the transaction request was authorized.

* * * * *